United States Patent

Brück et al.

[11] Patent Number: 5,959,264
[45] Date of Patent: Sep. 28, 1999

[54] SOUND ABSORBER

[76] Inventors: Eduard Brück, Hütte 1, D-51381 Leverkusen; Joachim Oetken, Unterstrasse 15c, D-42929 Wermelskirchen, both of Germany

[21] Appl. No.: 08/776,937

[22] PCT Filed: Aug. 10, 1995

[86] PCT No.: PCT/EP95/03172

§ 371 Date: May 6, 1997

§ 102(e) Date: May 6, 1997

[87] PCT Pub. No.: WO96/05591

PCT Pub. Date: Feb. 22, 1996

[30] Foreign Application Priority Data

Aug. 12, 1994 [DE] Germany .............................. 44 28 583

[51] Int. Cl.[6] .......................................................... E04B 1/82
[52] U.S. Cl. .......................................... 181/286; 181/295
[58] Field of Search .................................... 181/284, 285, 181/286, 288, 290, 294, 295

[56] References Cited

U.S. PATENT DOCUMENTS

| | | | |
|---|---|---|---|
| 4,242,398 | 12/1980 | Segawa et al. | 181/284 |
| 4,425,981 | 1/1984 | Kiesewetter et al. | 181/286 |
| 5,410,111 | 4/1995 | Stief et al. | 181/286 |

FOREIGN PATENT DOCUMENTS

| | | |
|---|---|---|
| 0214559 | 3/1987 | European Pat. Off. . |
| 0255473 | 2/1988 | European Pat. Off. . |
| 2758041 | 6/1979 | Germany . |
| 3233654 | 3/1984 | Germany . |
| 4011705 | 10/1991 | Germany . |
| 4035177 | 5/1992 | Germany . |
| 9215132 | 4/1993 | Germany . |
| 4241518 | 2/1994 | Germany . |

*Primary Examiner*—Khanh Dang
*Attorney, Agent, or Firm*—Martin A. Farber

[57] ABSTRACT

A sound absorber comprises a bottom portion and a structure portion joined to the bottom portion and closed off from outside, the structure portion having chamber walls forming hollow chambers, the hollow chambers being formed like small boxes or cups. Between the bottom portion and the structure portion, in the region of the hollow chambers, welds are formed between parts of the chamber walls of the structure portion and the bottom portion such that the chamber walls are in part welded to the bottom portion. In part the chamber walls project towards the bottom portion without being welded thereto such that an air gap is formed between an end of these chamber walls and the bottom portion, the hollow chambers forming a common air space enclosed between the structure portion and the bottom portion.

16 Claims, 4 Drawing Sheets

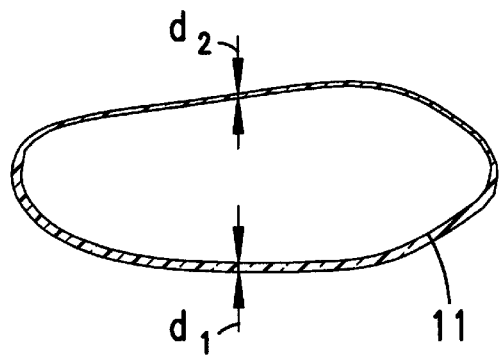
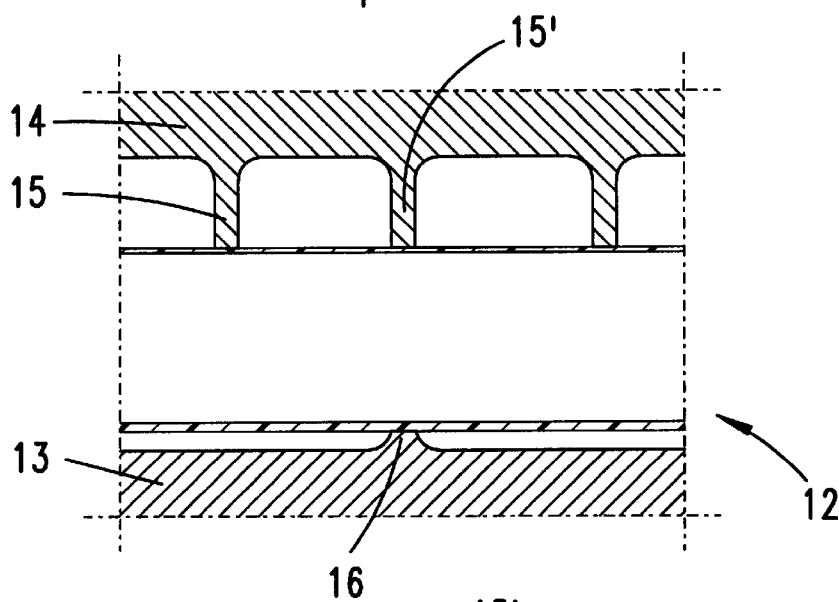
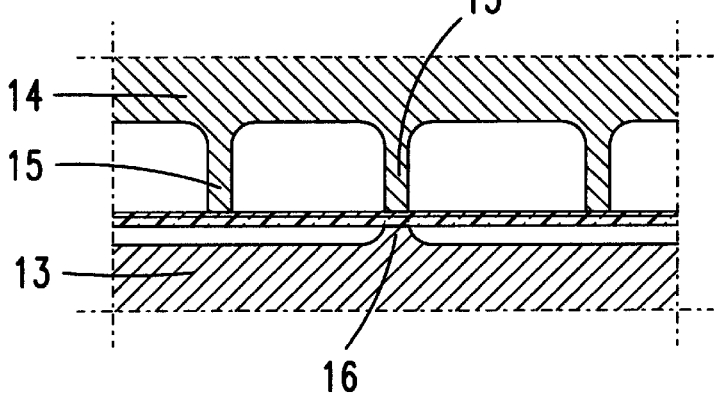
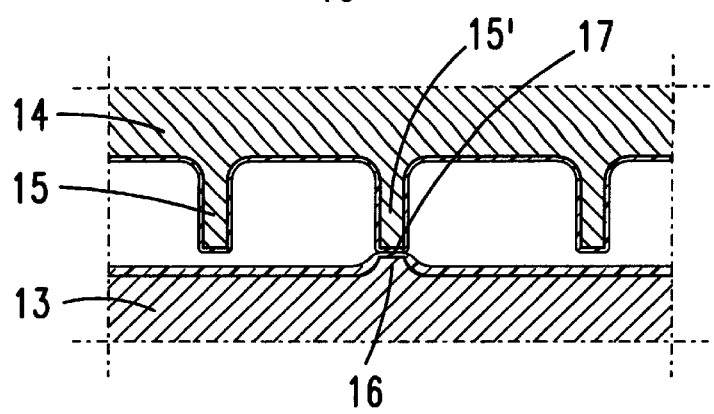

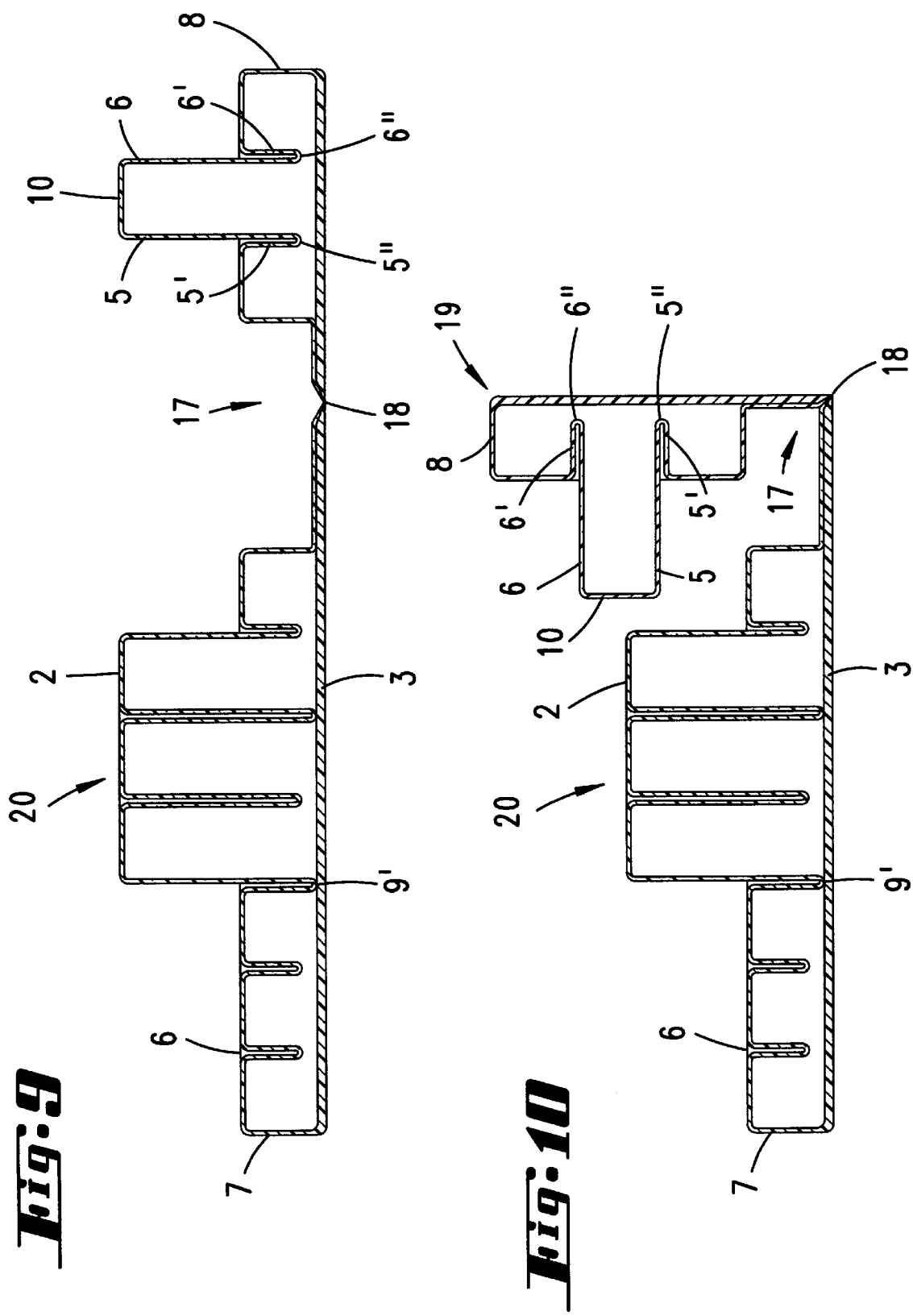

SOUND ABSORBER

FIELD AND BACKGROUND OF THE INVENTION

The invention relates to a sound absorber having a bottom portion and a structure portion, there being formed, in the structure portion, hollow chambers which have chamber walls and which are formed like small boxes or cups, and the bottom portion furthermore being joined to the structure portion, for example welded thereto, and the hollow chambers being open on one side.

An absorber of this kind is known, for example, from DE-OS 27 58 041. In the known absorber, the hollow chambers of the structure portion are covered by a planar film as the bottom portion, which film seals air-tight each of the air volumes contained in the individual hollow chambers. Furthermore, there is known, from DE-OS 40 11 705, a further embodiment of a sound absorber of this kind, in which the structure portion is joined only at the edge to the bottom portion. The joiner is provided here by means of an elastic sealing lip. The sound absorber may be manufactured as a whole in this manner by the blow moulding method. Embodiments are also known in which each hollow chamber is joined to the bottom portion, each such hollow chamber, open at the top, being formed however as a Helmholtz resonator. In a sound absorber known from DE-PS 32 33 654, there are likewise formed individual, separate hollow chambers which, however, have at the top side a structuring in the form of a groove.

Moreover, with regard to the state of the art, reference is further made to DE-OS 40 35 177, DE-PS 42 41 518 and DE-GM 92 15 132.

SUMMARY OF THE INVENTION

Starting from the state of the art initially mentioned, an object of the invention is to provide an absorber with a bottom portion and a structure portion, which absorber, with high acoustic effectiveness, also has a sufficient mechanical stability and is nevertheless manufacturable in an economical manner.

A sound absorber of this kind is initially and substantially formed in that, between the bottom portion and the structure portion, in the region of the hollow chambers, there are formed welds between the chamber walls of the structure portion and the bottom portion, that the welds extend in spot or linear form, that all hollow chambers of the absorber, when closed off from the outside, belong to a common air space enclosed between the structure portion and the bottom portion, and that there are formed hollow chambers, whose chamber walls, of substantially like extent in height, are in part welded to the bottom portion and in part directed projectingly towards the bottom portion, an air gap being left between an end face of the chamber wall and the bottom portion. There is also possible a partially integral edge transition between the bottom portion and the structure portion. A transition of this kind makes it possible, for example, to fabricate the sound absorber as a whole from a tube-form blank, preferably by the blow moulding method. In this connection, in further detail, the transition may also be cut off in a subsequent process section. In that, between the chamber walls of the structure portion and the bottom portion, there are provided welds distributed over the surface region of the sound absorber, there results a high stability. On the one hand, by the remaining spaced-apart walls of the structure portion in relation to the bottom portion, and on the other hand, precisely by the interposed welds, buckling is greatly prevented.

In that nonetheless all hollow chambers belong to a common air space enclosed between the structure portion and the carrier portion, there is provided, also acoustically, an advantageous construction. There is produced, by the remaining communicating openings, which are relatively small in cross-section, a noticeable frictional influence on application of sound to the common air space. In an embodiment, it may be provided that the welds extend island-like. While the latter is also preferred, it may also in principle be provided that welds, mainly linear, extend starting from the respective edges up to a central region of the sound absorber, the welds or weld lines not merging into one another, but running offset from one another. In particular in respect of the discussed island-like welds, it is in any case preferably provided that the welds are disposed offset from one another. It may also be further provided that the linear welds extend at right angles to one another, but do not as a rule or necessarily meet. Butt-joined welds are also possible, however. Both for the island-like welds and also for the welds starting from edges of the sound absorber, extending offset from one another, the hollow chambers are as a general rule open downwards, i.e., the bottom portion never completely closes a hollow chamber. However, it is possible, with the preferably provided rectangular or square plan of a hollow chamber, for a hollow chamber to be sealed by welds on up to three sides. With regard to the hollow chambers, it may also be provided, in particular, that the latter have different sizes.

This can relate, on the one hand, to the spacings between the vertical-chamber walls of a hollow chamber in planar direction, and also, on the other hand, to the height of the hollow chambers. It is especially preferred, in connection with the remaining air gap between an end face of a wall of a hollow chamber and the opposing bottom portion, that a relatively large hollow chamber is surrounded by a multiplicity of small hollow chambers. The top closing walls may likewise be disposed at a different height. With regard to the smaller hollow chambers, it is preferred, in this connection, that the top closing walls are, at the same time, disposed also at a lower level of height than those of the large hollow chambers. The starting material may be, for example, propylene, preferably mixed with glass fibre. Furthermore, it is also preferred that with integral transition between the bottom portion and the structure portion, the bottom portion and the structure portion have different (starting) wall thicknesses. In respect of the tube-like starting form of the material for the bottom portion and for the structure portion already mentioned further above, a tube portion of this kind correspondingly has different wall thicknesses around its circumference. This can be achieved, for example, by the extrusion method. It is also of importance that there is in question a complete component, which is manufactured by the extrusion blow moulding method. With regard to manufacture, there is present an integral arrangement, even if this is not always detectable in the finished product without further consideration. It is furthermore of importance that the hollow chambers are disposed offset from one another in such a way that there cannot result a continuous fold line, at any rate not in a main longitudinal direction or in a main transverse direction, or further preferred, substantially not in any direction of the sound absorber.

An arrangement of this kind is furthermore of importance also for an integral stability of the complete sound absorber. This also with respect to the described walls of the hollow chambers, which are formed projecting freely downwards, but without touching the bottom portion. An integral stability of this kind is of importance, for example, when using a sound absorber of this kind as an engine-compartment covering. Even by a very severe vibratory load associated with this, there cannot take place a striking together of the projecting chamber walls and the bottom portion, even with an acoustically optimal small adjustment of the remaining air gap. Also of further importance is a development of the sound absorber in which, in the structure portion and in the bottom portion, there are formed coincident fold lines, for the folding of an absorber portion region. In this manner, there may be achieved, again with integral formation of the sound absorber as a whole, a complete adaptation in shape, for example, to an engine compartment. Also in this connection, the air volumes in the individual portion regions may be joined together. Moreover, it is also possible, however, for an interruption to be formed in this respect in a fold line, and for each absorber portion region then to have an isolated air volume. The fold lines may especially be formed in particular like a film hinge. Moreover, it is preferred for the folded absorber portion region to be joined permanently to the further portion region of the sound absorber. There may be formed welds on hollow chambers which meet one another. Moreover, however, there may also be joints or screw connections. In so far as there is discussion of welds above, each of these may also be replaced, also in respect of the connection between the structure portion and the bottom portion, in a further embodiment, by adhesive joints, even though welds are preferred. In addition, the portion described above as the bottom portion may also be spoken of as the carrier portion.

BRIEF DESCRIPTION OF THE DRAWINGS

With the above and other objects and advantages in view, the present invention will become more clearly understood in connection with the detailed description of a preferred embodiment, when considered with the accompanying drawings of which:

FIG. 4 shows a cross-section through a tube portion as starting element for an absorber according to FIG. 1;

FIG. 5 shows a tube portion according to FIG. 4, inserted into a blow mould, before closing of the mould, in a partial cross-sectional representation;

Fig. 6 shows a representation according to FIG. 5 with inserted tube element, after closing of the mould;

FIG. 7 shows a representation according to FIG. 5 or FIG. 6, after completion of a blowing operation and before removal from the mould;

FIG. 9 shows a substantially schematic cross-sectional view of a sound absorber with fold line prepared; and FIG. 10 shows a sound absorber according to FIG. 9 with folded portion region.

DETAILED DESCRIPTION OF THE PREFERRED EMBODIMENT

Figure 1:
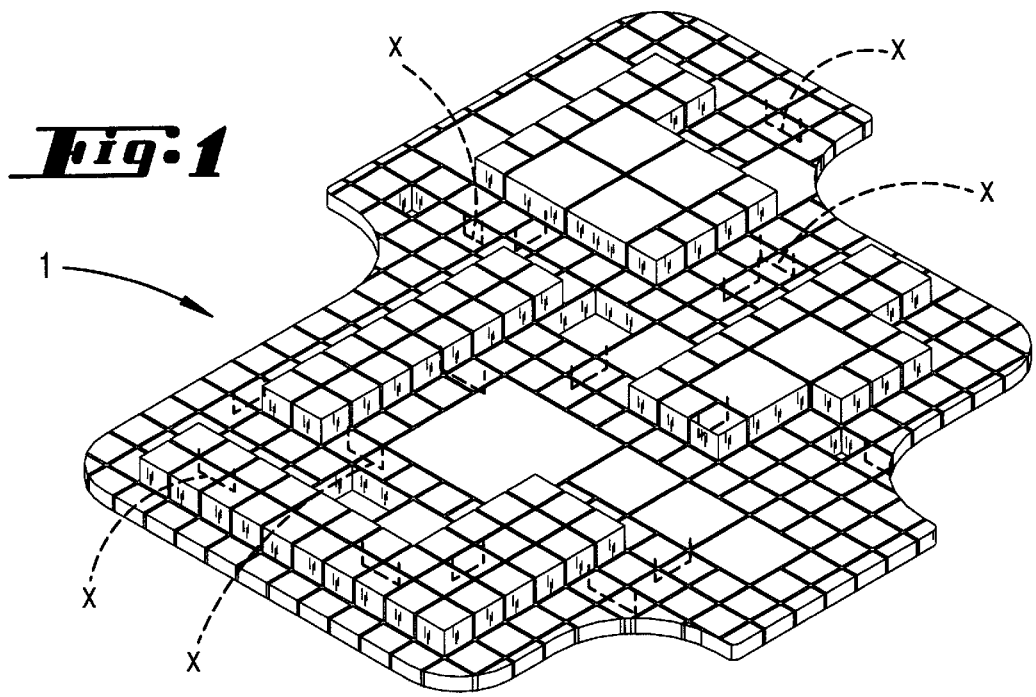
FIG. 1 shows a perspective representation of an absorber.
Figure 2:
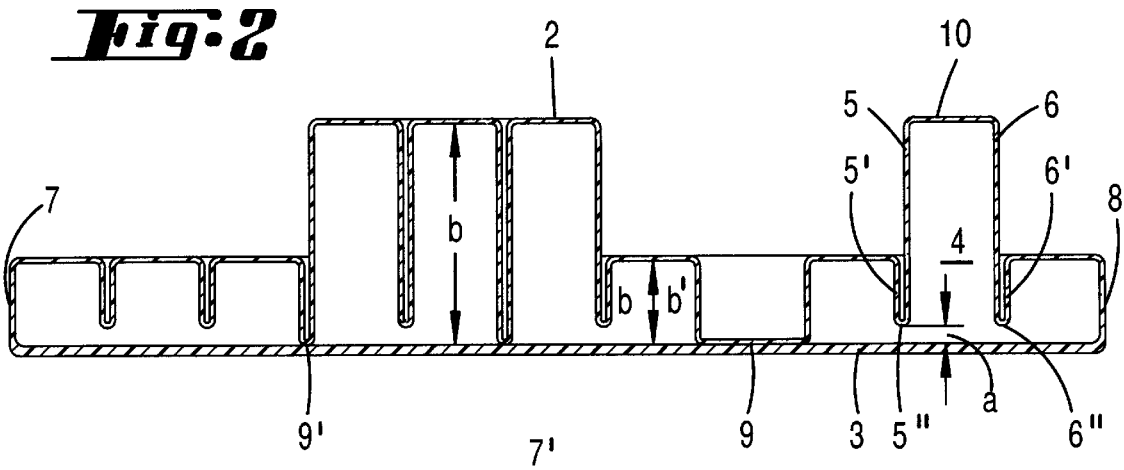
FIG. 2 shows a cross-section through an absorber according to FIG. 1.

There is represented and described, initially with reference to FIG. 1, a sound absorber 1, which comprises a structure portion 2 and bottom portion 3 (compare also FIG. 2). In the structure portion 2, there are formed hollow chambers 4 open on one side, namely towards the bottom portion 3, which hollow chambers have chamber walls 5, 6 (see also FIG. 2 in this connection). The hollow chambers 4 are formed, in the embodiment, to be fully box-like or cup-like. Each hollow chamber 4 has an upper, substantially planar top surface 10 and likewise planar, substantially vertically aligned chamber walls 5, 6. The bottom portion 3 is joined to the structure portion 2 in two edge regions 7, 8 by integral transition and at the end edges extending transversely thereto by welding. The designations "bottom portion" and "structure portion" are intended solely to indicate that the hollow forms are formed as a rule and preferably mainly in the structure portion. The carrying function is produced substantially by an interplay of structure portion and bottom portion. A greater wall thickness of the bottom portion is not necessarily needed for this purpose, even though preferably provided.

Figure 3:
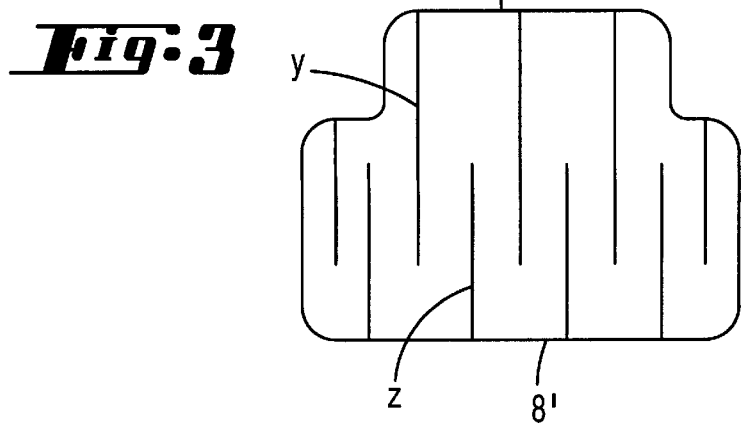
FIG. 3 shows a schematic representation of an absorber with weld lines indicated.

It is a principal feature that in the embodiment, as is also evident from FIG. 2, there are formed, in the region of the hollow chambers 4, two welds 9, 9' between the structure portion and the bottom portion 3. The welds are, in the embodiment, disposed in linear manner. In detail, chamber walls 5 and 6 are welded along their faces or points or transitions 5", 6" facing the bottom portion 3, between two chamber walls 5, 5' and the bottom portion 3. There may also be provided spot-type welds. In the regions in which no welds are formed, and this is as a rule the case with respect to one chamber wall 5 of a hollow chamber 4, the points or transitions between the chamber walls 5, 5' are spaced from the bottom portion 3—substantially uniformly over the entire absorber for all comparable chamber walls 5, namely at a spacing a. The spacing a, in order to be acoustically effective, may amount to about 1 to 4 mm, with a height of a "large" hollow chamber 4 of about 30 to 40 mm. Preferred in this connection is a spacing of about 2 mm. In this connection, the spacing a is not just linked substantially to the height of the hollow chambers 4, but is influenced rather by the atmospheric friction still effective at this spacing. There is preferred, however, in relation to a height b of a hollow chamber 4, a spacing in the region of 3 to 7, preferably about 5% of the overall height. Furthermore, the welds x, as indicated in FIG. 1, may extend island-like. Moreover, there may also extend welds y, z, as is indicated in FIG. 3, starting from the respective edges 7' or 8', comb-like, intermeshing with one another, but not joined to one another (in respect of welds starting from opposite edges). The edge regions 7', 8', from which the welds y, z extend in this connection, may preferably be such as are welded in any case.

As is further evident from FIG. 1, and as has also been further discussed already, the hollow chambers 4 may have different sizes. This may be achieved, on the one hand, by the base of the hollow chambers being of different size, and also, in combination or alternatively, by a top surface 10 of a hollow chamber 4 having a differently sized spacing b, b' (compare FIG. 2) from the bottom portion 3.

A thermoplastic weldable material is used, for example, propylene mixed with glass fibre.

As is apparent in particular from FIG. 4, an absorber 1 of this kind may be manufactured from an extruded tube portion 11—by the blow moulding method, as explained in greater detail below. The tube portion 11 has different wall thicknesses, d1 and d2 respectively, around its circumference. The tube portion may, for example, be extruded.

As is further apparent from FIGS. 5 to 7, this tube portion 11 is introduced in its entirety into a blow mould 12 for manufacture of the absorber according to FIG. 1. In this connection, there are provided, in the top mould 13 and in the bottom mould 14, wall elements 15, which correspond to the intermediate spaces between two chamber walls 5, 5'. As an alternative to the representation according to FIG. 5, in which a wall element 16 is also provided in the top mould, the wall element 15' may also be provided in the bottom mould to have a correspondingly greater height. This suggests, however, that the bottom portion of the absorber 1 may also be structured.

As is further apparent from a comparison of FIGS. 6 and 7, there may be achieved, after a closing of the mould, an engagement of the regions in question against the top mould and bottom mould respectively by blowing in air between the thicker and the thinner layer of the tube portion 11. In the region of the wall elements 16 and 15' which meet close to one another when the mould is closed, there results a welding between the structure portion and the bottom portion.

Figure 8:
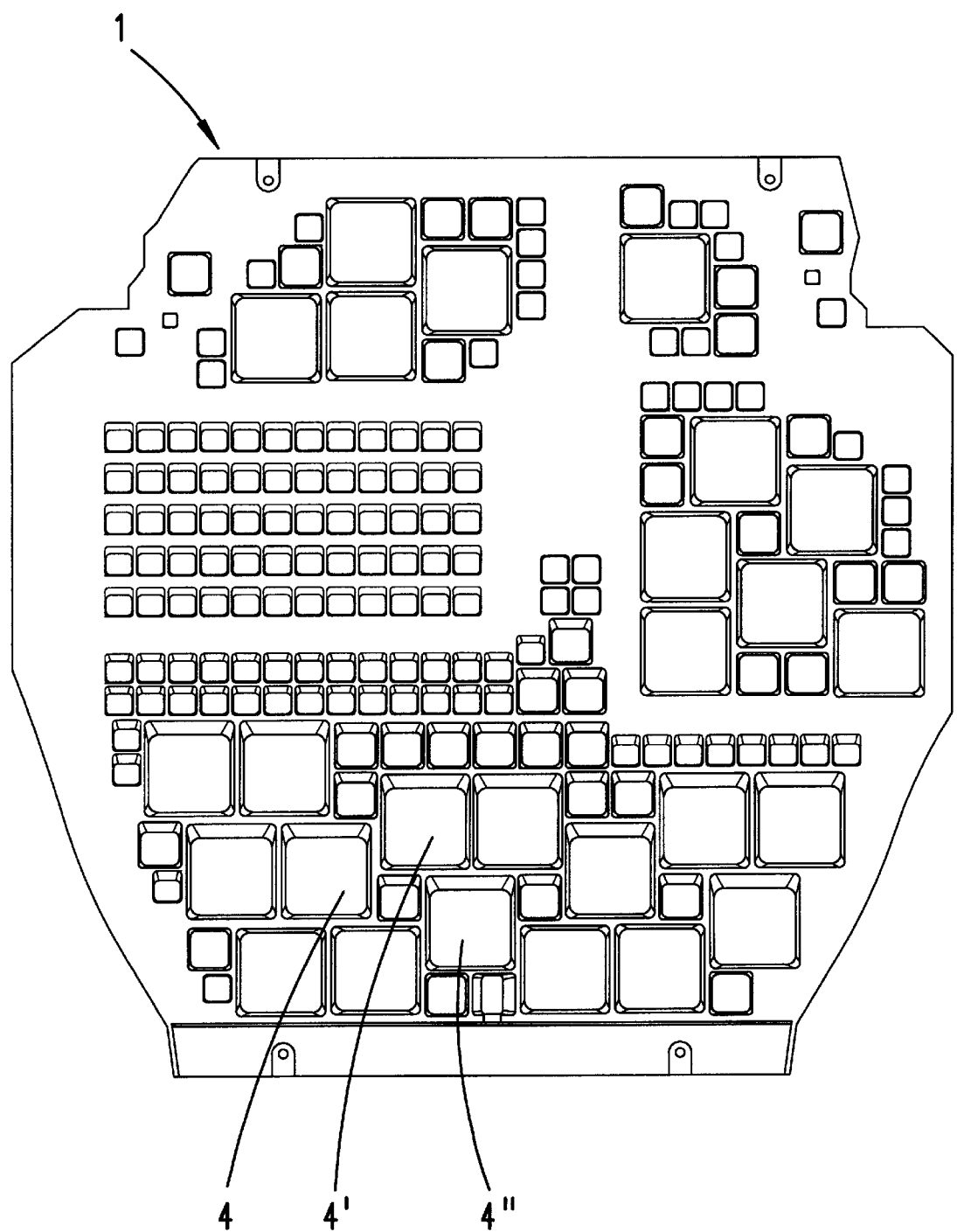
FIG. 8 shows a top view of a further embodiment of a sound absorber.

With regard to the embodiment of FIG. 8, there is represented a further sound absorber in top view. In this connection, the edge regions are cut off, so that there is no longer provided an integral transition between the structure portion and the bottom portion, but with regard to material, the structure portion 2 and bottom portion 3 are directly associated in the sense of being in one piece.

Further, it is to be recognised in particular with regard to the embodiment of FIG. 8, that the hollow chambers 4, 4', 4" etc. are disposed offset from one another in such a way that there results substantially no continuous fold line, in particular along the main axis of the sound absorber. In a horizontal direction of extent of two opposite chamber walls 5, 5', there is disposed, as a rule, one chamber wall 6 of a further hollow chamber 4, extending transversely to wall 5, 5'. By this means, there is achieved a high integral stability of the sound absorber. At the same time, there is also still produced, by the described spacing a of individual chamber walls from the bottom portion 3 and the disposition offset from one another, a positive acoustic effect. Overall, the spacing described may be used in connection with the sizes of the hollow chambers 4 and the fine adjustment of the spacing a for a frequency-related "detuning" or precise adjustment of the sound absorber 1.

The offset disposition of the hollow chambers 4 from one another and also the different size of the individual hollow chambers 4 results in a very high stability of the absorber 1 as a whole. Not least, this construction also facilitates the partially projecting formation of individual walls of the hollow chambers 4 opposite the bottom portion 6. Despite the small spacing a described, there cannot take place such deformations of the absorber 1 that there results, for example, a narrowing of the spacings a, or that an undesirable noise is developed by this, even in the presence of a vibratory load.

In FIG. 9, there is shown, in schematic representation, a further cross-section through a sound absorber 1. In this case, by contrast, there is formed a fold line 17 covering the structure portion 2 and the bottom portion 3. As opposed to the previously described arrangement, a fold line is thus expressly provided and desired here. In detail, this is achieved in that the structure portion 2 and the bottom portion 3, in overlying disposition, are each reduced in thickness, in cross-section extending wedge-like from two sides, in such a way that there results a transition 18 like a film hinge. On both sides of the reduction in thickness, there is formed a flat superposition of the structure portion 2 and the bottom portion 3, in order to maintain a collision-free space when folding up (FIG. 10). On account of the generally mitre-cut type formation, there results a possibility of folding, as is represented in FIG. 10. One absorber portion region 19 is folded up approximately at right angles to a remaining absorber portion region 20. Further, the represented folded form according to FIG. 10 may be secured by a weld or screw connection. There may also be provided, which is not represented in detail, at the meeting of hollow chambers 4, an adhesive joint or also welding between these chambers.

We claim:

1. A sound absorber comprising:
   a bottom portion;
   a structure portion joined at an edge to said bottom portion and closed off from the outside, said structure portion having chamber walls forming hollow chambers, said hollow chambers being formed like small boxes or cups; and
   wherein spaced from said edge, said chamber walls in a first part thereof are welded to said bottom portion, and in a second part thereof project towards said bottom portion such that an air gap is formed between an end of said second part of said chamber walls and said bottom portion, said hollow chambers belonging to a common air space enclosed between the structure portion and the bottom portion.

2. A sound absorber according to claim 1, wherein an integral, edge side transition is formed between said structure portion and said bottom portion at said edge.

3. A sound absorber according to claim 1, further comprising welds formed between said first part of said chamber walls and said bottom portion, said welds extend island-like.

4. A sound absorber according to claim 1, further comprising welds formed between said first part of said chamber walls and said bottom portion, said welds are disposed offset from one another.

5. A sound absorber according to claim 1, further comprising welds formed between said first part of said chamber walls and said bottom portion, said welds are linear, and said linear welds are disposed at right angles to one another.

6. A sound absorber according to claim 1, wherein the hollow chambers have different sizes.

7. A sound absorber according to claim 1, wherein the hollow chambers have different heights.

8. A sound absorber according to claim 1, wherein the bottom portion and the structure portion have different wall thicknesses.

9. A sound absorber according to claim 1, wherein said structure portion and said bottom portion have least one coinciding fold line for folding a region of the sound absorber.

10. A sound absorber according to claim 9, wherein said fold lines are formed film-hinged.

11. A sound absorber according to claim 9, wherein said fold line joins said region fixed to a further region of the sound absorber.

12. A sound absorber according to claim 1, wherein the bottom portion is joined to the structure portion by being welded thereto at said edge.

13. A sound absorber according to claim 1, further comprising welds formed between said first part of said chamber walls and said bottom portion, wherein the welds extend in spot or linear form.

14. A sound absorber according to claim 1, wherein said hollow chambers have substantially the same height.

15. A sound absorber according to claim 1, wherein said chamber walls are formed U-shaped between adjacent of said hollow chambers, said U-shaped chamber walls have U-shaped curved ends, respectively, forming said first part and said end of said second part, respectively, of said chamber walls.

16. A sound absorber comprising:

a bottom portion;

a structure portion joined to said bottom portion at an edge, said structure portion having chamber walls forming a plurality of hollow chambers having box or cup shape;

wherein, spaced from said edge, a chamber wall of respective of said hollow chambers projects toward and has an end spaced from said bottom portion such that an air gap is formed between said end and said bottom portion, and other of said chamber walls of said hollow chambers extend towards and are connected to said bottom portion; and wherein said air gap between said end and said bottom portion communicates with other respective of said air gaps of respective of said hollow chambers, so as to form a common air space enclosed between the structure portion and the bottom portion.

* * * * *